United States Patent
Ihara

(10) Patent No.: US 10,275,883 B2
(45) Date of Patent: Apr. 30, 2019

(54) DATA SORTING APPARATUS, DATA SORTING METHOD, AND DATA SORTING PROGRAM

(71) Applicant: FUJIFILM Corporation, Tokyo (JP)

(72) Inventor: Satoshi Ihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/473,099

(22) Filed: Mar. 29, 2017

(65) Prior Publication Data

US 2017/0287130 A1 Oct. 5, 2017

(30) Foreign Application Priority Data

Apr. 1, 2016 (JP) .................................. 2016-073908

(51) Int. Cl.
*G06T 7/00* (2017.01)
(52) U.S. Cl.
CPC .. *G06T 7/0012* (2013.01); *G06T 2207/10081* (2013.01)
(58) Field of Classification Search
CPC ..................... G06T 7/0012; G06T 2207/10081
See application file for complete search history.

(56) References Cited

U.S. PATENT DOCUMENTS

| | | | | |
|---|---|---|---|---|
| 2003/0224344 A1* | 12/2003 | Shamir | ................... | G06F 19/24 435/4 |
| 2006/0170695 A1* | 8/2006 | Zhou | ...................... | G06T 15/04 345/582 |
| 2008/0267481 A1 | 10/2008 | Nakamura | | |
| 2013/0058574 A1* | 3/2013 | Malgouyres | ....... | G06K 9/00463 382/173 |
| 2014/0029806 A1* | 1/2014 | Nihei | ...................... | G06T 7/004 382/106 |
| 2015/0193943 A1* | 7/2015 | Li | ......................... | G06T 7/0093 382/131 |
| 2015/0199832 A1 | 7/2015 | Kitamura | | |
| 2015/0305702 A1* | 10/2015 | Sakimoto | ............... | A61B 6/025 382/131 |

FOREIGN PATENT DOCUMENTS

| | | |
|---|---|---|
| JP | 2008-259682 A | 10/2008 |
| JP | 2014-71716 A | 4/2014 |
| WO | WO 01/73428 A1 | 10/2001 |

* cited by examiner

*Primary Examiner* — Brenda C Bernardi
(74) *Attorney, Agent, or Firm* — Birch, Stewart, Kolasch & Birch, LLP

(57) ABSTRACT

Plural pieces of data where N (N>2) elements are arranged in a predetermined-direction in a specific-order are sorted into any one of N labels using a graph-cut-process. Each of the plural pieces of data has scores indicating element-likenesses for the plural respective elements. For each piece of data, weights are set about links along a first-direction directing from a node s to a node t so that a small weight is given to a link corresponding to an element having a maximum-score in the data. A weight for regulating cutting is set about links along a second-direction opposite to the first-direction and links along a direction in which the order of the respective pieces of data progresses. A graph-cut-process is executed on a graph for which the weights are set to determine links to be cut, and the N labels are allocated to the plural pieces of data.

16 Claims, 10 Drawing Sheets

FIG. 7
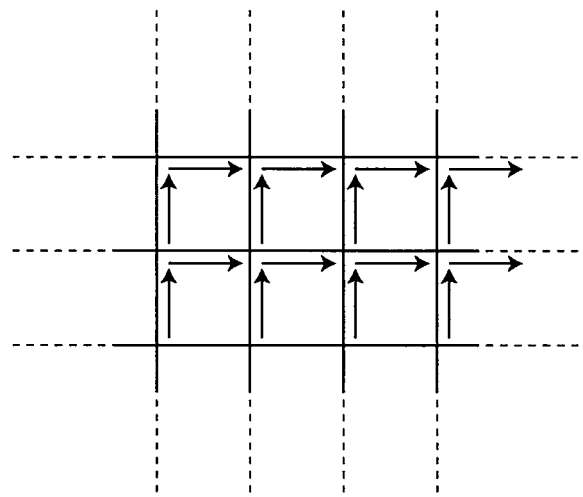
FIG. 8
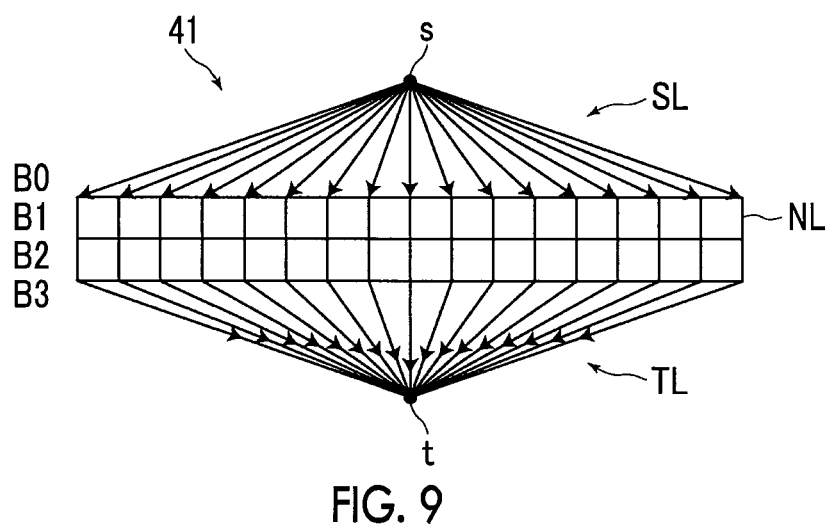
FIG. 9
| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| B0 | 5 | 6 | 7 | 6 | 5 | 3 | 0 | 0 | 4 | 0 | 0 | 0 | 0 | 0 | 0 | 0 | 0 |
| B1 | 0 | 0 | 0 | 0 | 6 | 0 | 8 | 7 | 3 | 4 | 7 | 6 | 7 | 3 | 0 | 0 | 0 |
| B2 | 0 | 0 | 0 | 0 | 0 | 0 | 0 | 0 | 2 | 3 | 5 | 5 | 6 | 8 | 7 | 0 | 2 |
| B3 | 0 | 1 | 10 | 1 | 0 | 0 | 0 | 1 | 0 | 0 | 0 | 0 | 0 | 0 | 6 | 4 | 9 |

FIG. 10
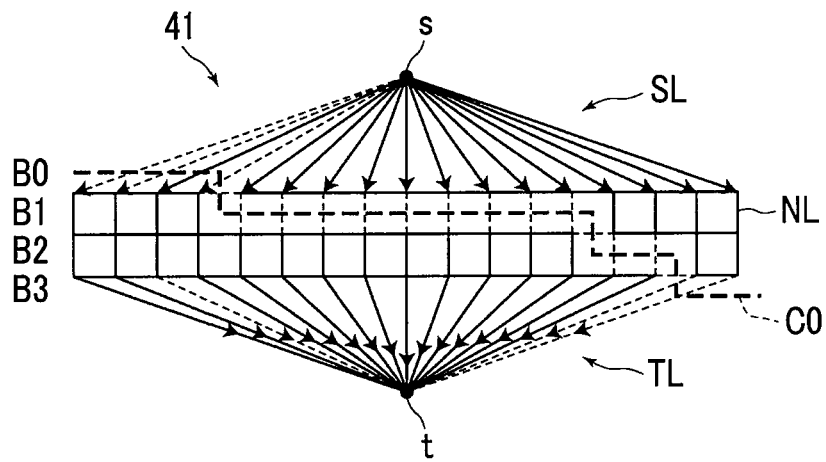
FIG. 11
| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| B0 | 5 | 6 | 7 | 6 | 4 | 3 | 0 | 0 | 4 | 0 | 0 | 0 | 0 | 0 | 0 | 0 | 0 |
| B1 | 0 | 0 | 0 | 0 | 6 | 2 | 8 | 7 | 3 | 4 | 7 | 6 | 7 | 3 | 0 | 0 | 0 |
| B2 | 0 | 0 | 0 | 0 | 0 | 0 | 0 | 0 | 0 | 1 | 5 | 5 | 6 | 8 | 7 | 0 | 2 |
| B3 | 0 | 1 | 10 | 1 | 0 | 0 | 0 | 1 | 0 | 0 | 0 | 0 | 5 | 7 | 6 | 4 | 9 |
FIG. 12
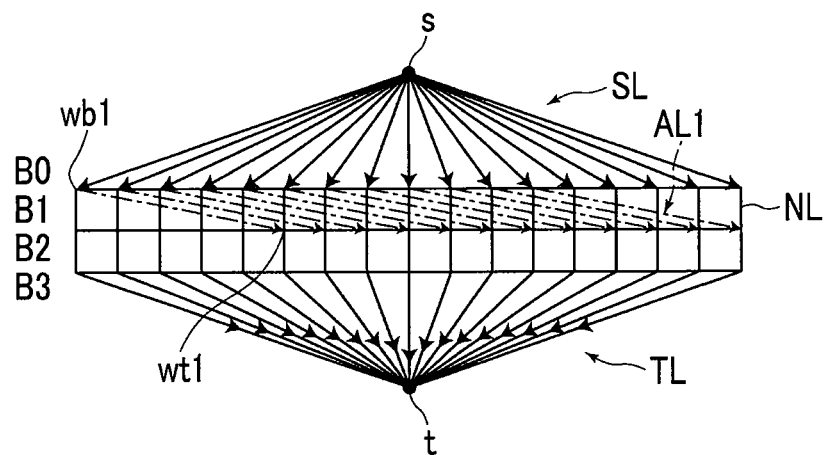

FIG. 13
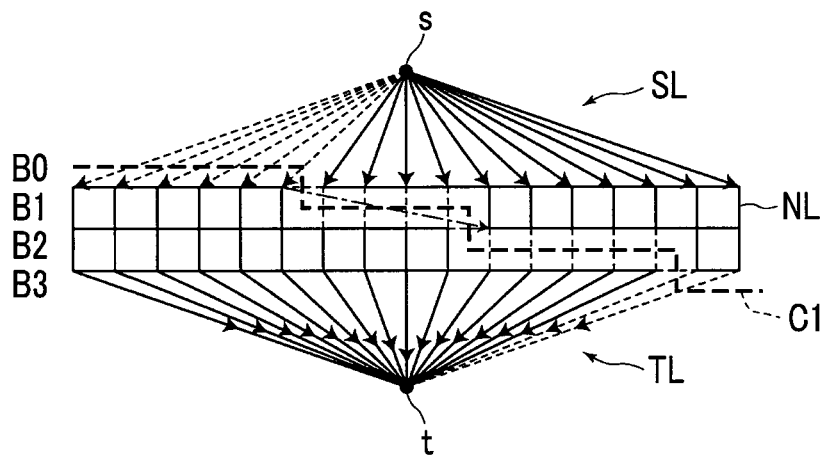
FIG. 14
|    | 1 | 2 | 3  | 4 | 5 | 6 | 7 | 8 | 9 | 10 | 11 | 12 | 13 | 14 | 15 | 16 | 17 |
|----|---|---|----|---|---|---|---|---|---|----|----|----|----|----|----|----|----|
| B0 | 5 | 6 | 7  | 6 | 4 | 3 | 0 | 0 | 4 | 0  | 0  | 0  | 0  | 0  | 0  | 0  | 0  |
| B1 | 0 | 0 | 0  | 0 | 6 | 2 | 8 | 7 | 3 | 4  | 7  | 6  | 7  | 3  | 0  | 0  | 0  |
| B2 | 0 | 0 | 0  | 0 | 0 | 0 | 0 | 0 | 1 | 5  | 5  | 6  | 8  | 7  | 0  | 0  | 2  |
| B3 | 0 | 1 | 10 | 1 | 0 | 0 | 0 | 1 | 0 | 0  | 0  | 0  | 5  | 7  | 6  | 4  | 9  |
FIG. 15
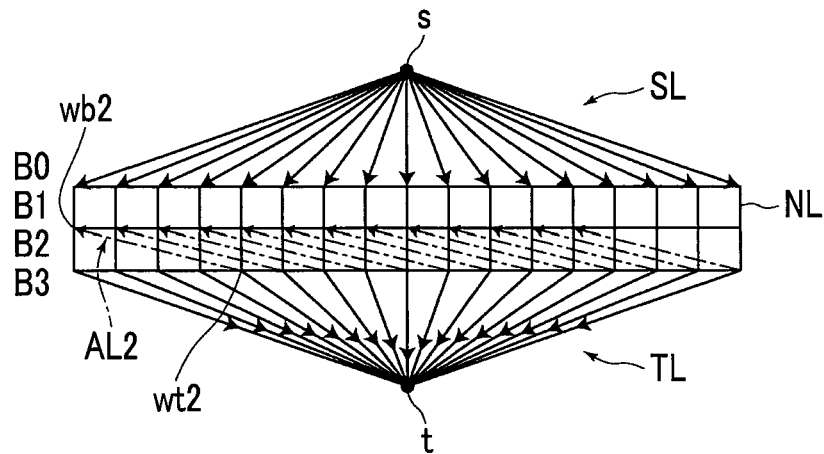

FIG. 16
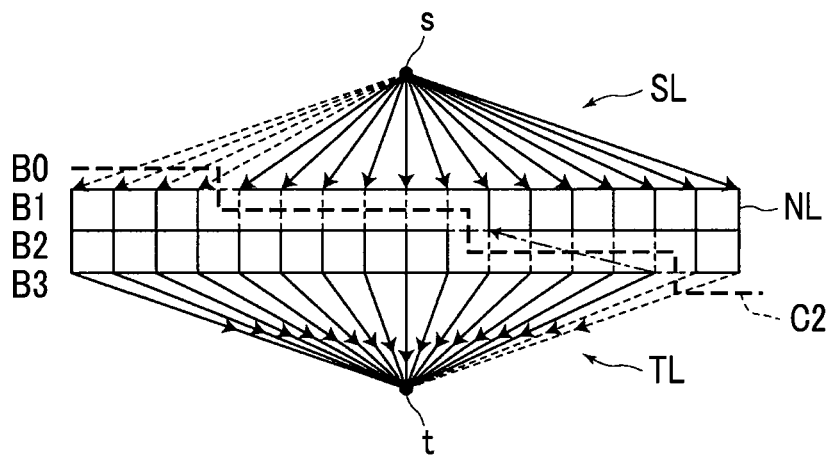
FIG. 17
|    | 1 | 2 | 3  | 4 | 5 | 6 | 7 | 8 | 9 | 10 | 11 | 12 | 13 | 14 | 15 | 16 | 17 |
|----|---|---|----|---|---|---|---|---|---|----|----|----|----|----|----|----|----|
| B0 | 5 | 6 | 7  | 6 | 4 | 3 | 0 | 0 | 4 | 0  | 0  | 0  | 0  | 0  | 0  | 0  | 0  |
| B1 | 0 | 0 | 0  | 0 | 6 | 2 | 8 | 7 | 3 | 4  | 7  | 6  | 7  | 3  | 0  | 0  | 0  |
| B2 | 0 | 0 | 0  | 0 | 0 | 0 | 0 | 0 | 0 | 1  | 5  | 5  | 6  | 8  | 7  | 0  | 2  |
| B3 | 0 | 1 | 10 | 1 | 0 | 0 | 0 | 1 | 0 | 0  | 0  | 0  | 5  | 7  | 6  | 4  | 9  |
FIG. 18
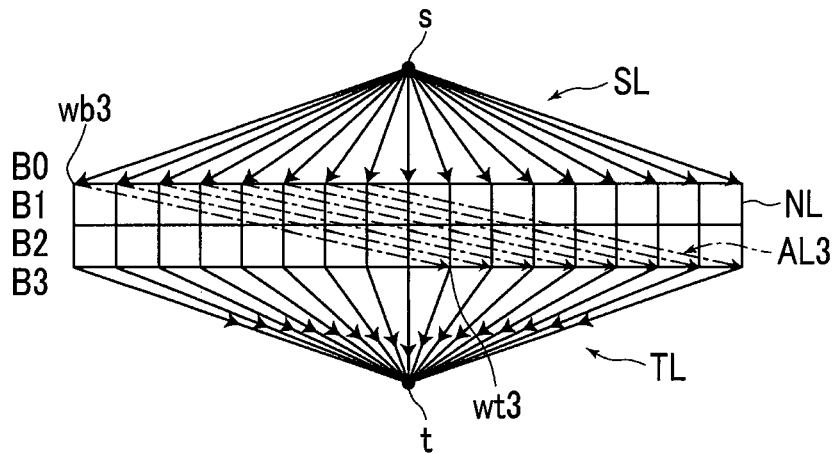

FIG. 19
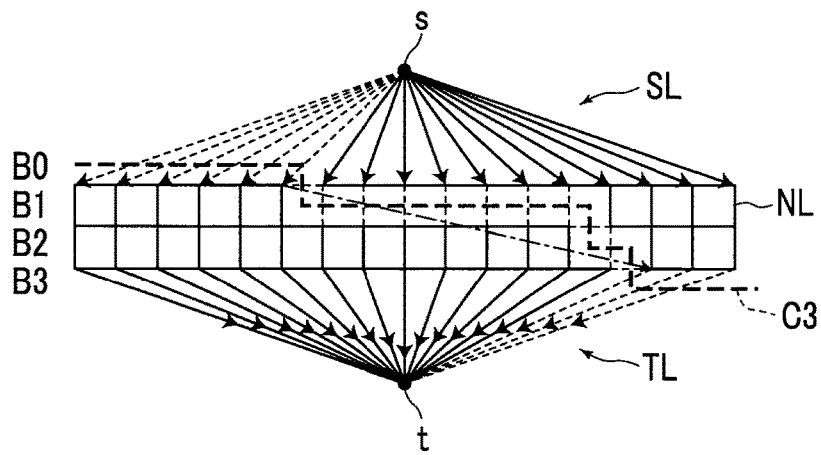
FIG. 20
| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| B0 | *5* | *6* | *7* | *6* | *4* | *3* | 0 | 0 | 4 | 0 | 0 | 0 | 0 | 0 | 0 | 0 | 0 |
| B1 | 0 | 0 | 0 | 0 | 6 | 2 | *8* | *7* | *3* | *4* | *7* | *6* | 7 | 3 | 0 | 0 | 0 |
| B2 | 0 | 0 | 0 | 0 | 0 | 0 | 0 | 0 | 0 | 1 | 5 | 5 | 6 | *8* | 7 | 0 | 2 |
| B3 | 0 | 1 | 10 | 1 | 0 | 0 | 0 | 1 | 0 | 0 | 0 | 0 | 5 | 7 | *6* | *4* | *9* |
FIG. 21
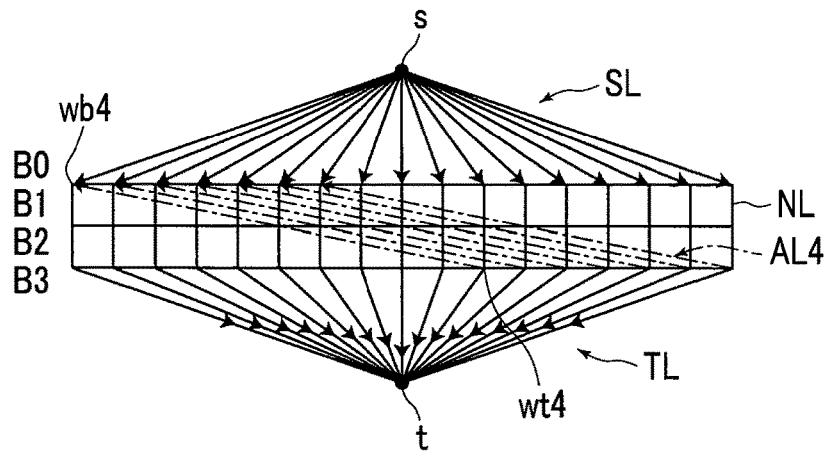

|    | 1 | 2 | 3  | 4 | 5 | 6 | 7 | 8 | 9 | 10 | 11 | 12 | 13 | 14 | 15 | 16 | 17 |
|----|---|---|----|---|---|---|---|---|---|----|----|----|----|----|----|----|----|
| B0 | *5* | *6* | *7* | *6* | 4 | 3 | 0 | 0 | 4 | 0  | 0  | 0  | 0  | 0  | 0  | 0  | 0  |
| B1 | 0 | 0 | 0  | 0 | *6* | *2* | *8* | *7* | *3* | *4* | *7* | *6* | *7* | 3  | 0  | 0  | 0  |
| B2 | 0 | 0 | 0  | 0 | 0 | 0 | 0 | 0 | 0 | 1  | 5  | 5  | 6  | *8* | *7* | 0  | 2  |
| B3 | 0 | 1 | 10 | 1 | 0 | 0 | 0 | 1 | 0 | 0  | 0  | 0  | 5  | 7  | 6  | *4* | *9* |

DATA SORTING APPARATUS, DATA SORTING METHOD, AND DATA SORTING PROGRAM

CROSS-REFERENCE TO RELATED APPLICATIONS

The present application claims priority under 35 U.S.C. § 119 to Japanese Patent Application No. 2016-073908, filed on Apr. 1, 2016. The above application is hereby expressly incorporated by reference, in its entirety, into the present application.

BACKGROUND OF THE INVENTION

1. Field of the Invention

The present invention relates to a data sorting apparatus, a data sorting method, and a data sorting program for sorting a plurality of pieces data in which a plurality of elements are arranged in a predetermined direction in a specific order into a label of each element using a graph cut process.

2. Description of the Related Art

Along with speed increase in an imaging modality such as computed tomography (CT) or magnetic resonance imaging (MRI) or enhancement of multi-slice performance therein, it is possible to perform imaging of a plurality of portions of a patient in an imaging series to acquire several hundreds to several thousands of tomographic images. Thus, since the patient does not need to be imaged several times for each portion and an imaging time is also reduced as a whole, the burden of the patient is reduced. On the other hand, readers such as imaging diagnosticians who read acquired images may be different according to portions which are targets of reading and diagnosis. Thus, a reader who is in charge of reading each portion needs to search for only a tomographic image necessary for reading from a plurality of tomographic images in which a plurality of portions are included to perform reading and diagnosis, which causes increase in time and labor necessary for the reading and diagnosis.

Thus, it is extremely important to recognize which portions a plurality of tomographic images acquired by imaging correspond to, and to sort the tomographic images. Further, if a portion included in a tomographic image is known, it is possible to perform an optimal imaging process for the portion with respect to the tomographic image. In addition, if included portions with respect to a plurality of tomographic images acquired in different imaging series are known, it is possible to simultaneously display tomographic images of corresponding tomographic sections between the imaging series for diagnosis.

As a technique for recognizing portions, a technique for using a determiner generated through machine learning or the like in the unit of tomographic images has been proposed, for example. However, the recognition in the unit of tomographic images has a limited recognition rate. Accordingly, in order to accurately recognize the portions, it is necessary to acquire recognition results for all tomographic images, and to match the recognition results in the respective tomographic images in consideration of an order in which the portions are arranged, for example.

Accordingly, a technique for correcting portion recognition results in tomographic images of axial sections that intersect a body axis of a human body using anatomical features of the human body relating to a hierarchical relationship of portions has been proposed (see JP2008-259682A). In JP2008-259682A, recognition results of portions included in a plurality of tomographic images are corrected using information indicating that a chest portion is present under a head portion and a leg portion is present under an abdominal portion. With such a technique, it is possible to sort the plurality of tomographic images according to portions.

In the meanwhile, recently, energy minimization using a graph cut algorithm has been actively applied to image processing. Particularly, a method for efficiently solving the problem of image region division as an energy minimization problem has been proposed. For example, JP2014-071716A discloses a technique for accurately region-dividing an image having characteristics in shape using a graph cut process. Further, a technique for sorting a set of gene elements in addition to images using a graph cut process has also been proposed (see WO01/73428A).

SUMMARY OF THE INVENTION

As described above, it is very important to sort a plurality of tomographic images according to portions, that is, to sort a plurality of pieces of data in which elements are arranged in a predetermined direction in a specific order according to portions for each element, and thus, it is preferable to sort the plurality of pieces of data according to elements with high accuracy.

In the meanwhile, there is a case where portions that form a human body have features in their length. For example, the thigh bone is 20 cm no matter how it is short, and is shorter than 1 m at the longest. Thus, if the lengths of these portions are used, the sorting accuracy of a plurality of tomographic images is enhanced. Further, as well as the tomographic images, for example, with respect to arrangement of genes, if the lengths of gene arrangements in sets of gene elements are used, the sorting accuracy of gene elements is enhanced.

The invention has been made in consideration of the above-mentioned problems, and an object of the invention is to provide a data sorting apparatus, a data sorting method, and a data sorting program capable of sorting a plurality of pieces of data in which elements are arranged in a predetermined direction in a specific order with high accuracy.

According to an aspect of the invention, there is provided a data sorting apparatus that sorts, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, including: labeling means for determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order. Here, the labeling means sets, for each piece of data, weights with respect to the s link, the t link, and the n links along the first direction so that a small weight is given to a link corresponding to an element having a maximum score in the data, sets a weight for regulating cutting with respect to n links along a second direction opposite to the first direction and n links along a direction in which the order of the respective pieces of data progresses, among the plurality of n links, and determines the links to be cut among the s links, the t links and the n links by executing the graph cut process with respect to the graph for which the weights are set, and allocates the N labels corresponding to the respective elements to the plurality of pieces of data.

The links cut in the graph cut process are links of which weights are set to be smaller than those of the other links. The "weight for regulating cutting" means an extremely large weight compared with the other links so that links in which the weight is set are not cut. As such a weight, for example, an infinite weight may be used.

In the data sorting apparatus according to the aspect of the invention, the labeling means may set, in a case where an upper limit value is set for the number of pieces of data to which the same label is allocated, a first additional link that connects a first reference node which becomes a reference of a layer disposed on the node s side and a first target node which becomes a target on a layer disposed on the node t side with respect to data which is more distant by one tomographic image from the upper limit value in the direction where the order of the respective pieces of data progresses from the first reference node, in a direction that directs from the first reference node to the first target node, between two layers which become boundaries of an n link corresponding to an element of a label for which the upper limit value is set, and may allow cutting with respect to only links of a number which is equal to or smaller than the number of links intersected by the first additional link, with respect to the n links that connect the nodes w corresponding to data to which the label for which the upper limit value is set is allocated.

Further, in the data sorting apparatus according to the aspect of the invention, the labeling means may set, in a case where a lower limit value is set for the number of pieces of data to which the same label is allocated, a second additional link that connects a second reference node which becomes a second reference of a layer disposed on the node s side and a second target node which becomes a target on a layer disposed on the node t side with respect to data which is less distant by one tomographic image from the lower limit value in the direction where the order of the respective pieces of data progresses from the second reference node, in a direction that directs from the second target node to the second reference node, between two layers which become boundaries of an n link corresponding to an element of a label for which the lower limit value is set, and may allow cutting with respect to only links of a number which exceeds the number of links in which the second additional link is included, with respect to the n links that connect the nodes w corresponding to data to which the label for which the lower limit value is set is allocated.

The "links in which the second additional link is included" means n links intersected by the second additional link and two n links in which the second reference node and the second target node are respectively included.

In the data sorting apparatus according to the aspect of the invention, the labeling means may set, in a case where an upper limit value is set for the number of pieces of data to which a plurality of continuous labels are allocated, a third additional link that connects a third reference node which becomes a reference of a layer disposed most closely to the node s side and a third target node which becomes a target on a layer disposed most closely to the node t side with respect to data which is more distant by one tomographic image from the upper limit value in the direction where the order of the respective pieces of data progresses from the third reference node, in a direction that directs from the third reference node to the third target node, between two layers which become boundaries of the n links corresponding to elements of a plurality of labels for which the upper limit value is set, and may allow cutting with respect to only links of a number which is equal to or smaller than the number of links that are intersected by the third additional link, with respect to the n links that connect the nodes w corresponding to data to which a plurality of labels for which the upper limit value is set are allocated.

In addition, in the data sorting apparatus according to the aspect of the invention, the labeling means may set, in a case where a lower limit value is set for the number of pieces of data to which the plurality of continuous labels are allocated, a fourth additional link that connects a fourth reference node which becomes a reference of a layer disposed most closely to the node s side and a fourth target node which becomes a target on a layer disposed most closely to the node t side with respect to data which is less distant by one tomographic image from the lower limit value in the direction where the order of the respective pieces of data progresses from the fourth reference node, in a direction that directs from the fourth target node to the fourth reference node, between two layers which become boundaries of the n links corresponding to elements of a plurality of labels for which the lower limit value is set, and may allow cutting with respect to only links of a number which is equal to or smaller than the number of links in which the fourth additional link is included, with respect to the n links that connect the nodes w corresponding to data to which a plurality of labels for which the lower limit value is set are allocated.

The "links in which the fourth additional link is included" means n links intersected by the fourth additional link and two n links in which the fourth reference node and the fourth target node are respectively included.

Further, in the data sorting apparatus according to the aspect of the invention, the plurality of pieces of data may be a plurality of tomographic images in a plurality of sections perpendicular to an axis that extends in a predetermined direction, with respect to a subject in which N (N>2) portions are arranged in the predetermined direction in a specific order from 0 to N−1, and the elements may be the portions.

According to another aspect of the invention, there is provided a data sorting method for sorting, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the method including: a step of determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order. Here, the step includes a step of setting, for each piece of data, weights with respect to the s link, the t link, and the n links along the first direction so that a small weight is given to a link corresponding to an element having a maximum score in the data, a step of setting a weight for regulating cutting with respect to n links along a second direction opposite to the first direction and n links along a direction in which the order of the respective pieces of data progresses, among the plurality of n links, and a step of determining the links to be cut among the s links, the t links and the n links by executing the graph cut process with respect to the graph for which the weights are set, and allocating the N labels corresponding to the respective elements to the plurality of pieces of data.

The data sorting method according to the aspect of the invention may be provided as a program for causing a computer to execute the data sorting method.

According to the invention, for each piece of data, weights are set for an s link, a t link, and n links in a first direction that directs from a node s to a node t so that a small weight is given to a link corresponding to an element having a maximum score in the data. Thus, it is possible to easily cut the link corresponding to the element having the maximum score in the data. Further, a weight for regulating cutting is set for n links along a second direction opposite to the first direction and n links along a direction in which the order of the respective pieces of data progresses, among a plurality of n links. Thus, it is possible to prevent links from being cut in a direction opposite to a specific order in which the plurality of pieces of data are arranged. In addition, a graph cut process is executed with respect to a graph in which weights are set to determine links to be cut among the s links, the t links, and the n links, and N labels are allocated to each tomographic image. Thus, it is possible to sort the plurality of pieces of data into a plurality of classes in an order in which the elements are arranged while maintaining the length for each element. Accordingly, it is possible to sort the plurality of pieces of data into the plurality of classes with high accuracy.

BRIEF DESCRIPTION OF THE DRAWINGS

FIG. 7 is a diagram illustrating setting of a weight for regulating cutting.

FIG. 8 is a diagram showing a graph illustrating determination of links to be cut.

FIG. 9 is a diagram showing a table of scores of likenesses of portions included in respective tomographic images.

FIG. 10 is a diagram showing links in which a weight becomes a minimum in the first embodiment.

FIG. 11 is a diagram showing a table in which scores with respect to allocated portions are indicated by bold and oblique numbers, in the first embodiment.

FIG. 12 is a diagram showing additional links according to a second embodiment.

FIG. 13 is a diagram showing links in which a weight becomes a minimum in the second embodiment.

FIG. 14 is a diagram showing a table in which scores with respect to allocated portions are indicated by bold and oblique numbers, in the second embodiment.

FIG. 15 is a diagram showing additional links according to a third embodiment.

FIG. 16 is a diagram showing links in which a weight becomes a minimum in the third embodiment.

FIG. 17 is a diagram showing a table in which scores with respect to allocated portions are indicated by bold and oblique numbers, in the third embodiment.

FIG. 18 is a diagram showing additional links according to a fourth embodiment.

FIG. 19 is a diagram showing links in which a weight becomes a minimum in the fourth embodiment.

FIG. 20 is a diagram showing a table in which scores with respect to allocated portions are indicated by bold and oblique numbers, in the fourth embodiment.

FIG. 21 is a diagram showing additional links according to a fifth embodiment.

DESCRIPTION OF THE PREFERRED EMBODIMENTS

Figure 1:
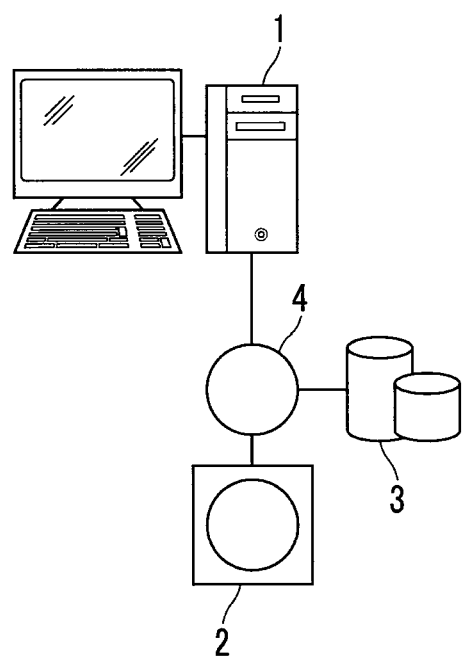
FIG. 1 is a hardware configuration diagram showing an overview of a diagnosis support system to which a data sorting apparatus according to a first embodiment of the invention is applied.

Hereinafter, embodiments of the invention will be described with reference to the accompanying drawings. FIG. 1 is a hardware configuration diagram showing an overview of a diagnosis support system to which a data sorting apparatus according to a first embodiment of the invention is applied. As shown in FIG. 1, in this system, a data sorting apparatus 1 according to the first embodiment, a three-dimensional image capture apparatus 2, and an image storage server 3 are connected to each other through a network 4 in a state where communication is possible therebetween.

Figure 2:
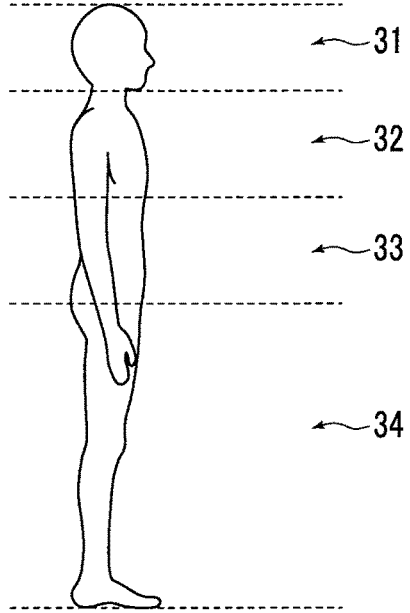
FIG. 2 is a diagram showing portions of a human body.

The three-dimensional image capture apparatus 2 is an apparatus that generates a three-dimensional image V0 by imaging a human body which is a subject, and specifically, is a CT apparatus, an MRI apparatus, a positron emission tomography (PET) apparatus, or the like. In this embodiment, it is assumed that the three-dimensional image capture apparatus 2 is the CT apparatus and generates the three-dimensional image V0 formed by a plurality of tomographic images in a body axis direction of the human body which is the subject. Here, the human body which is the subject includes N (N>2) portions in a specific order from 0 to N−1 in a predetermined direction. For example, as shown in FIG. 2, a plurality of portions of a head portion 31, a chest portion 32, an abdominal portion 33, and a leg portion 34 are arranged in the order in the body axial direction. The plurality of tomographic images are a plurality of tomographic images on a plurality of axial sections, arranged in an order corresponding to the order in which the plurality of portions are arranged. The three-dimensional image V0 generated by the three-dimensional image capture apparatus 2 is transmitted to the image storage server 3 to be stored. In the following description, numbers are given to the N portions, in which a first portion in the order in which the portions are arranged is given 0 and a final portion thereof is given N−1.

The image storage server 3 is a computer that stores and manages a variety of data, and is provided with a large capacity external storage device and software for database management. The image storage server 3 performs communication with other apparatuses through the wired or wireless network 4 to transmit or receive image data or the like. Specifically, the image storage server 3 acquires image data such as the three-dimensional image V0 generated by the three-dimensional image capture apparatus 2 through the network, and stores the image data in a recording medium such as a large capacity external storage device for management. An image data storage form and communication between apparatuses through the network 4 are based on a protocol such as a digital imaging and communication in medicine (DICOM).

The data sorting apparatus 1 is an apparatus configured such that a data sorting program of the invention is installed in one computer. The computer may be a workstation or a personal computer which is directly operated by a doctor who performs diagnosis, or may be a server computer connected thereto through a network. The data sorting program may be distributed in a state of being stored in a recording medium such as a digital versatile disc (DVD) or a compact disk read only memory (CD-ROM), and may be installed in a computer from the recording medium. Alternatively, the data sorting program may be stored in a storage device of a server computer connected to a network or in a network storage in a state of being accessible from the outside, and may be downloaded and installed in a computer used by a doctor in response to a request.

Figure 3:
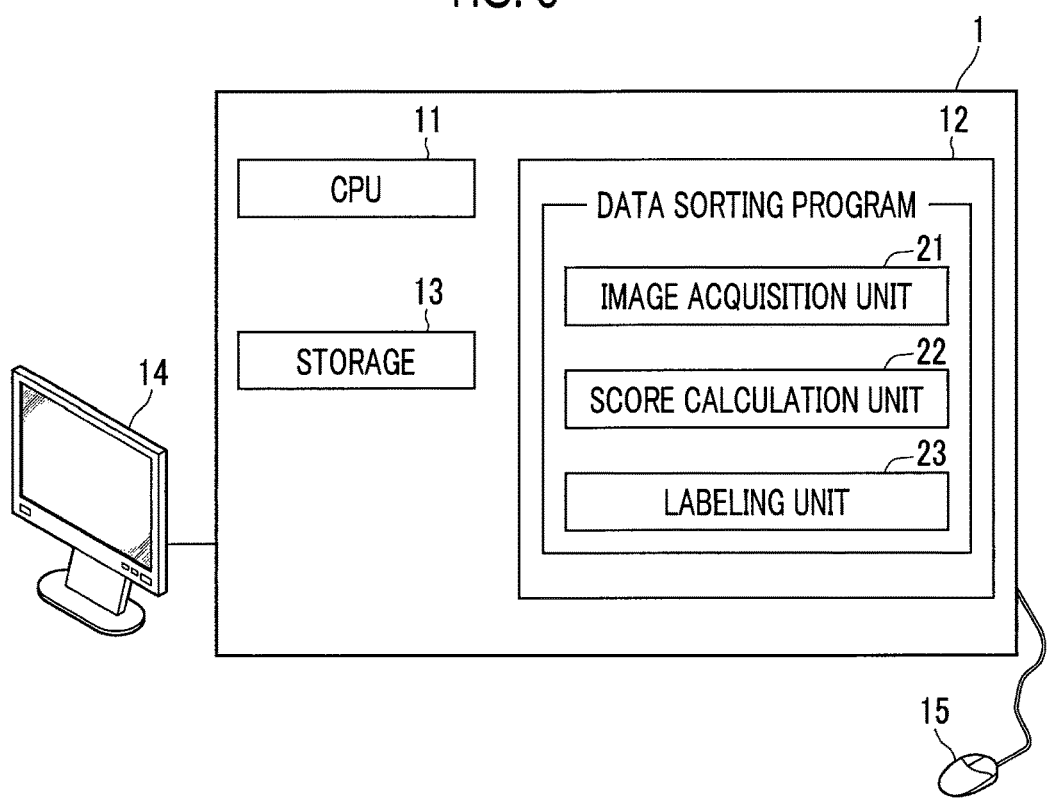
FIG. 3 is a diagram showing a schematic configuration of a data sorting apparatus realized by installing a data sorting program in a computer.

FIG. 3 is a diagram showing a schematic configuration of a data sorting apparatus realized by installing a data sorting program in a computer. As shown in FIG. 3, the data sorting apparatus 1 has a configuration of a normal workstation, and includes a central processing unit (CPU) 11, a memory 12, and a storage 13. Further, a display 14 and an input unit 15 such as a mouse are connected to the data sorting apparatus 1.

The storage 13 stores a variety of information including the three-dimensional image V0 acquired from the image storage server 3 through the network 4 and information necessary for processes in the data sorting apparatus 1 (which will be described later).

Further, the memory 12 stores a data sorting program. In addition, the memory 12 also serves as a work area when the data sorting program performs its processes. The data sorting program defines an image acquisition process of acquiring the three-dimensional image V0 acquired by the three-dimensional image capture apparatus 2, a score calculation process of calculating a score indicating a portion likeness for each of a plurality of portions included in a plurality of tomographic images, with respect to each of a plurality of tomographic images that form the three-dimensional image V0, and a labeling process of allocating a certain label for each portion in the plurality of tomographic images, as processes to be executed by the CPU 11.

As the CPU 11 executes the processes according to the program, the computer functions as an image acquisition unit 21, a score calculation unit 22, and a labeling unit 23. The data sorting apparatus 1 may include a plurality of processors that perform the image acquisition process, the score calculation process, and the labeling process, respectively. Further, the image acquisition unit 21 and the score calculation unit 22 may be provided separately from the data sorting apparatus of this embodiment.

The image acquisition unit 21 acquires the three-dimensional image V0 from the image storage server 3. In a case where the three-dimensional image V0 is already stored in the storage 13, the image acquisition unit 21 may acquire the three-dimensional image V0 from the storage 13.

Here, it is assumed that N portions that exceed two are included in a subject. The score calculation unit 22 calculates a score indicating a portion likeness for each of a plurality of portions, in each of the plurality of tomographic images that form the three-dimensional image V0. To this end, the score calculation unit 22 includes determiners of N classes acquired by machine-learning of each of the N portions. That is, if one tomographic image is input, the score calculation unit 22 calculates N scores indicating respective portion likenesses of the N portions. For example, if the portions include a head portion, a chest portion, an abdominal portion, and a leg portion, the score calculation unit 22 calculates four scores respectively indicating a head portion likeness, a chest portion likeness, an abdominal portion likeness, and a leg portion likeness, with respect to one tomographic image. In this embodiment, it is assumed that a score is a value of 0 to 10, for example, and as the score is larger, the portion likeness corresponding to the score is larger.

The labeling unit 23 allocates N labels for respective portions to a plurality of tomographic images using a graph cut process. Hereinafter, the labeling unit 23 will be described in detail.

Figure 4:
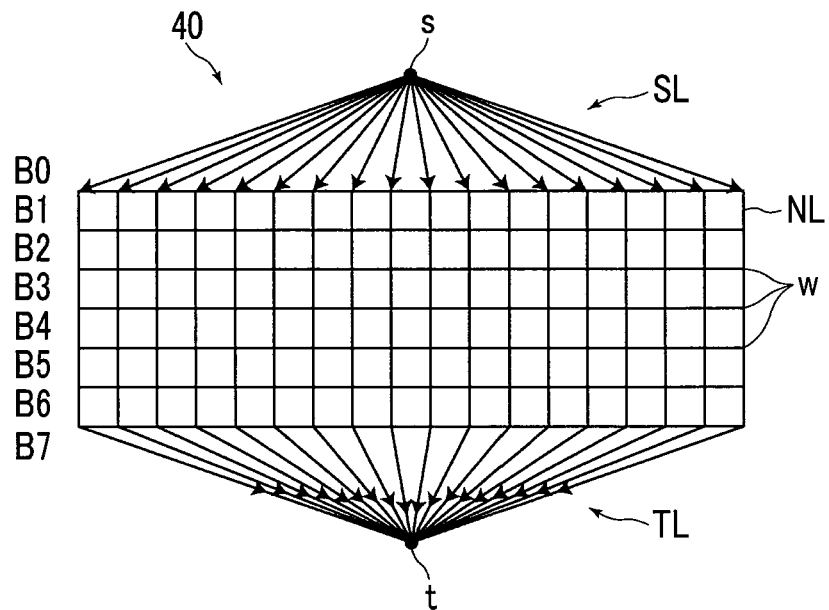
FIG. 4 is a diagram showing an example of a graph set in a labeling unit.

In the labeling unit 23, a graph to be used for the graph cut process is set. FIG. 4 is a diagram showing an example of the graph set in the labeling unit 23. As shown in FIG. 4, in a graph 40, a node s and a node t which are references of a 0-th portion and an (N−1)-th portion among N portions included in a plurality of tomogrphic images are provided. Further, between the node s and the node t, k (=N−1) stages of layers which are boundaries between the respective labels are provided in the order in which the N portions are arranged. Further, a plurality of nodes w corresponding to respective tomographic images, arranged in an order corresponding to the order in which the N portions are arranged, are provided on each layer i (i=1 to k). In addition, the graph 40 includes s links SL corresponding to the 0-th portion, which connect the node s and the entire nodes w in a first layer in a first direction that directs from the node s to the node t. Furthermore, the graph 40 includes t links TL corresponding to the (N−1)-th portion, which connect the entire nodes w in a k-th layer to the node t in the first direction. The graph 40 also includes n links NL that connect all the nodes w in both directions, in which spaces between the respective layers from the first layer to the k-th layer correspond to the first portion to an (N−2)-th portion. A direction from the node t to the node s is referred to as a second direction.

In the graph 40 shown in FIG. 4, N is 8, and when the number of tomographic images is represented as M, M is 18. Accordingly, the node s corresponds to a portion B0 with number 0 which is the first portion, and the node t corresponds to a portion B7 with number 7 which is the final portion, respectively. Further, the number of layers is 7, and six n links NL arranged in a vertical direction between the respective layers correspond to portions B1 to B6 with number 1 to number 6.

Figure 5:
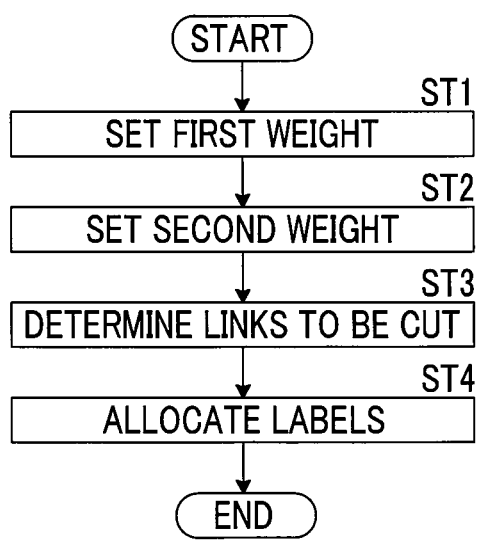
FIG. 5 is a flowchart showing a process performed in the first embodiment.

The labeling unit 23 determines links to be cut among the s links SL, the t links TL, and the n links NL using the graph cut process, and allocates, in an order in which portions of a human body are arranged, N labels corresponding to the respective portions to the respective tomographic images. Hereinafter, a label allocation process will be described. FIG. 5 is a flowchart of the label allocation process performed in this embodiment.

Figure 6:
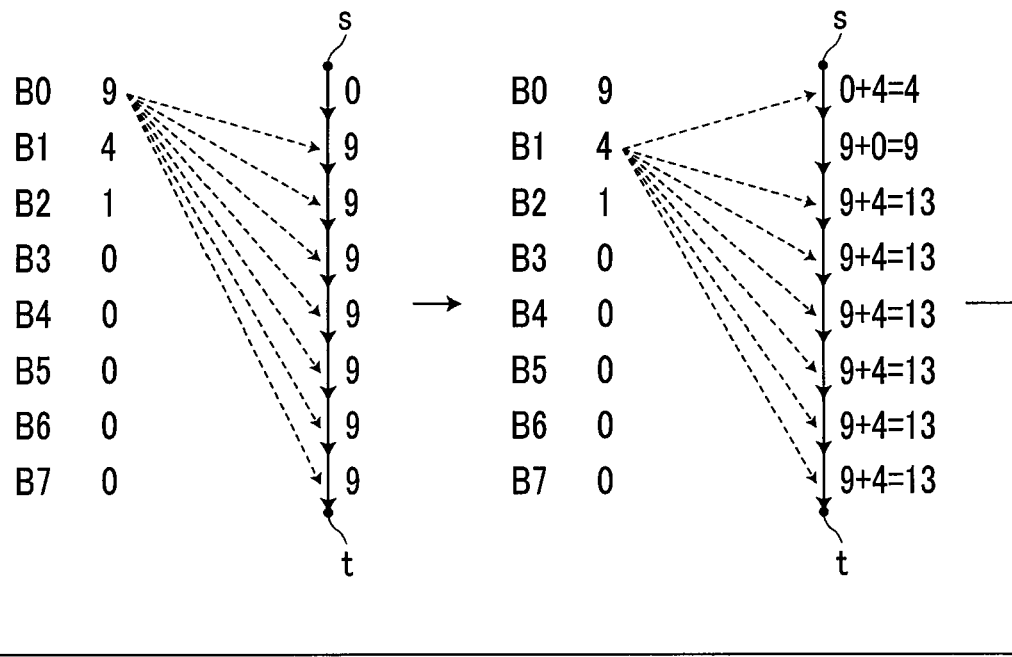
FIG. 6 is a diagram illustrating score addition for weights of links.
Figure 6:
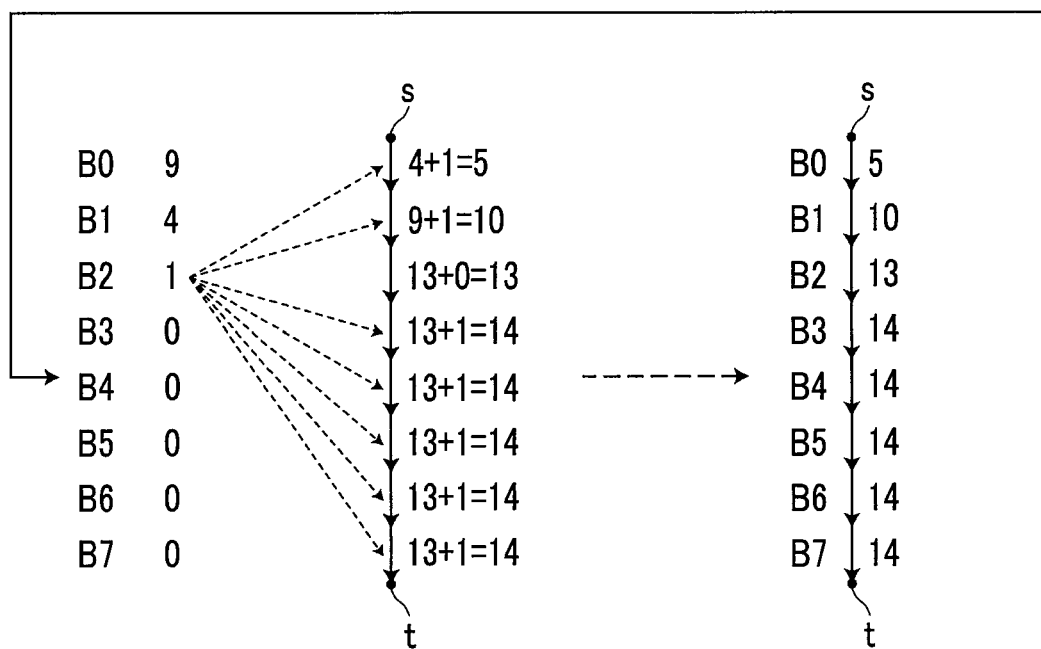

The labeling unit 23 sets, for each tomographic image, weights with respect to the s link SL, the t link TL, and the n links NL along the first direction so that a small weight is given to a link corresponding to a portion having a maximum score in the tomographic image. Hereinafter, this weight setting is referred to as a first weight setting (step ST1). Specifically, with respect to a score for each of the N portions in the tomographic image, a score of a target portion is added to the s links SL, the t links TL, and the n links NL other than the target portion as a weight. FIG. 6 is a diagram illustrating score addition for weights of links. In FIG. 6, score addition with respect to the first tomographic image is shown, in which scores indicating eight portion likenesses of the first tomographic image are set as (9, 4, 1, 0, 0, 0, 0, 0) in the order in which the portions are arranged.

The portion B0 with number 0 corresponds to the s link SL, the portions B1 to B6 with number 1 to 6 correspond to the n links NL, and the portion B7 with number 7 corresponds to the t link TL. For description, the n links NL corresponding to the portions B1 to B6 are referred to as n links NL1 to NL6. Since the score of the portion B0 of the first tomographic image is 9, the score of the portion B0 is not added to the weight of the s link SL corresponding to the portion B0, and the score of 9 is added to the weights of the n links NL1 to NL6 corresponding to the portions B1 to B6 and the weight of the t link TL corresponding to the portion B7. Thus, the weights of the s link SL, the n links NL1 to NL6, and the t link TL become (0, 9, 9, 9, 9, 9, 9, 9).

Then, since the score of the portion B1 of the first tomographic image is 4, 4 which is the score of the portion B1 is added to the weight of the s link SL, the score of the portion B1 is not added to the weight of the n link NL1 corresponding to the portion B1, and the score of 4 is added to the weights of the n links NL2 to NL6 corresponding to the portions B2 to B6 and the weight of the t link TL corresponding to the portion B7. Thus, the weights of the s link SL, the n links NL1 to NL6, and the t link TL become (4, 9, 13, 13, 13, 13, 13, 13).

Then, since the score of the portion B2 of the first tomographic image is 1, 1 which is the score of the portion B2 is added to the weight of the s link SL and the weight of the n link NL1 corresponding to the portion B1, and the score of the portion B2 is not added to the weight of the n link NL2 corresponding to the portion B2, and the score of 1 is added to the weights of the n links NL3 to NL6 corresponding to the portions B3 to B6 and the weight of the t link TL corresponding to the portion B7. Thus, the weights of the s link SL, the n links NL1 to NL6, and the t link TL become (5, 10, 13, 14, 14, 14, 14, 14).

Thereafter, by adding the scores of all the portions to weights of links other than the corresponding link in a similar manner, the weights of the s link SL, the n links NL1 to NL6, and the t link TL become (5, 10, 13, 14, 14, 14, 14, 14). Accordingly, the weight of the s link SL becomes a minimum.

In this way, by setting the weights of the s link SL, the n links NL1 to NL6, and the t link TL, as a result, in the s link SL, the n links NL1 to NL6, and the t link TL along the first direction, a weight of a link corresponding to a portion having a maximum score in a tomographic image becomes a minimum.

The labeling unit 23 sets, for all tomographic images, weights with respect to the s links SL, the t links TL, and the n links NL along the first direction similar to the above description so that a small weight is given to a link corresponding to an element having a maximum score in each tomographic image.

Further, the labeling unit 23 sets a weight for regulating cutting with respect to n links along the second direction opposite to the first direction and n links along a direction in which the order of respective tomographic images progresses, among the plurality of n links NL. Hereinafter, this weight setting is referred to as a second weight setting (step ST2). FIG. 7 is a diagram illustrating weight setting for regulating cutting. As shown in FIG. 7, only a part of the n links are shown. As shown in FIG. 7, the labeling unit 23 sets a weight for regulating cutting with respect to links in the second direction in the plurality of n links NL, that is, in an upward direction indicated by arrows in FIG. 7, and links in a rightward direction in which the order of tomographic images progresses, indicated by arrows in FIG. 7. Specifically, an infinite weight is added to the links in the upward direction and the links in the rightward direction. The weight to be set is not limited to the infinite weight, and a weight of a finite value may be added as long as the value is sufficiently larger than the weights obtained by the score addition with respect to the portions described above. In this way, by setting a weight for regulating cutting, only links along downward and rightward directions are cut when cutting links as described later.

The labeling unit 23 determines links to be cut among the s link SL, the t link TL, and the n links NL by executing the graph cut process with respect to the graph 40 in which the weights are set (step ST3). Further, the labeling unit 23 allocates N labels corresponding to the portions to each of the tomographic images in the graph 40 (step ST4), and then, terminates the processes.

Hereinafter, determination of link to be cut will be described in detail. FIG. 8 is a diagram showing a graph illustrating determination of links to be cut. In the graph 41 shown in FIG. 8, for description, it is assumed that the number N of portions is 4 and the number M of tomographic images is 17. Scores of portion likenesses of the respective tomographic images are shown in table T1 of FIG. 9. In table T1, numerical values 1 to 17 in a first row represent numbers given to the tomographic images. Numerical values in a second row represent scores indicating likenesses of the portions B0 of the respective tomographic images, numerical values in a third row represent scores indicating likenesses of the portions B1 of the respective tomographic images, numerical values in a fourth row represent scores indicating likenesses of the portions B2 of the respective tomographic images, and numerical values in a fifth row represents scores indicating likenesses of the portions B3 of the respective tomographic images.

Here, in the following description, it is assumed that a link in the first direction of the graph 41 is represented by a combination of a reference sign of a portion and a tomographic image number shown in table T1. For example, a link from a node "s" to a node "w" in a first layer of a first tomographic image is represented as (B0, 1).

In a case where the scores indicating the likenesses of the portions B0 to B3 of the plurality of tomographic images are values shown in FIG. 9, links in which a weight in the first direction becomes a minimum are as follows: (B0, 1), (B0, 2), (B3, 3), (B0, 4), (B1, 5), (B1, 6), (B1, 7), (B1, 8), (B1, 9), (B1, 10), (B1, 11), (B1, 12), (B1, 13), (B2, 14), (B2, 15), (B3, 16), and (B3, 17). The links in which the weight in the first direction of the graph 41 becomes a minimum are indicated by broken lines in FIG. 10.

Here, in this embodiment, since a weight for regulating cutting is set in the links in the downward direction and the rightward direction, in the graph 41, only the links along the downward and rightward directions are cut. In the graph 41, the link (B0, 1) and the link (B0, 2) correspond to the s links SL, the link (B3, 3) corresponds to the t link TL, and the link (B0, 4) corresponds to the s link SL. In a case where a weight for regulating cutting is set in the upward direction and the rightward direction, there is no case in which after the link (B3, 3) is cut, the link (B0, 4) is cut. Accordingly, in this embodiment, instead of the link (B3, 3), the link (B0, 3) is cut.

Accordingly, in the graph 41, (B0, 1), (B0, 2), (B0, 3), (B0, 4), (B1, 5), (B1, 6), (B1, 7), (B1, 8), (B1, 9), (B1, 10), (B1, 11), (B1, 12), (B1, 13), (B2, 14), (B2, 15), (B3, 16), and (B3, 17) among the links along the first direction are determined as links to be cut. Further, a link between the fourth and fifth tomographic images, a link between the thirteenth and fourteenth tomographic images, and a link between the fifteenth and sixteenth tomographic images, which are disposed between the links to be cut, among the links along the rightward direction are determined as links to be cut. Thus, links are cut as indicated by a broken line C0 in FIG. 10.

As a result, labels of the portions B0 to B3 are respectively allocated to each of the tomographic images shown in the graph 41. Here, the links in the first direction of the graph 41 correspond to the respective tomographic images. In the inks in the first direction of the graph 41, the labeling unit 23 allocates labels of portions corresponding to cut links to tomographic images corresponding to the links in the first direction. Thus, the portion B0 is allocated to the first to fourth tomographic images, the portion B1 is allocated to the fifth to thirteenth tomographic images, the portion B2 is allocated to the fourteenth to fifteenth tomographic images, and the portion B3 is allocated to the sixteenth to seventeenth tomographic images, respectively.

With respect to the plurality of tomographic images to which the portions B0 to B3 are allocated in this way, scores with respect to the allocated portions become values indicated by bold and oblique numbers shown in FIG. 11. An addition value of the scores becomes large a value compared with a case where any other links are cut.

In this way, in this embodiment, in a graph, for each tomographic image, weights are set with respect to the s link SL, the t link TL, and the n links NL in the first direction so that a small weight is given to a link corresponding to a portion having a maximum score in the tomographic image. Thus, it is easy to cut the link corresponding to the portion having the maximum score in the tomographic image. Further, a weight for regulating cutting is set with respect to n links NL along the second direction opposite to the first direction and n links NL along a direction in which the order of respective tomographic images progresses, among the plurality of n links NL. Thus, it is possible to prevent links from being cut in a direction opposite to the order in which a plurality of tomographic images are arranged. In addition, since the graph cut process is executed with respect to a graph in which weights are set to determine links to be cut among the s links SL, the t links TL, and the n links NL and N labels are allocated to each tomographic image, it is possible to sort the plurality of tomographic images into a plurality of classes in the order in which the portions are arranged while maintaining the length for each portion. Accordingly, it is possible to sort the plurality of tomographic images into the plurality of classes with high accuracy.

Next, a second embodiment of the invention will be described. The second embodiment is different from the first embodiment in only the processes performed by the labeling unit 23 and has the same device configuration as that of the first embodiment, and thus, detailed description of the device will not be repeated. The second embodiment is different from the first embodiment in that an upper limit value is set for the number of tomographic images to which the same portion is allocated.

FIG. 12 is a diagram illustrating determination of links to be cut in the second embodiment. In FIG. 12, the same graph as the graph 41 shown in FIG. 8 is shown. In order to set an upper limit value for the number of tomographic images to which the same portion is allocated, the labeling unit 23 sets a first additional link that connects a first reference node which becomes a reference of a layer disposed on a node s side and a first target node which becomes a target on a layer disposed on a node t side with respect to a tomographic image which is more distant by one tomographic image from the upper limit value set in a direction in which the order of tomographic images progresses from the first reference node, in a direction that directs from the first reference node to the first target node, between two layers which become boundaries of an n link NL corresponding to a portion of a label for which the upper limit value is set. Specifically, in a case where an upper limit value of 4 is set for the portion B 1, a node w corresponding to the first tomographic image on a boundary layer between the portion B0 and the portion B1 of the graph 41 is set as a first reference node wb1. In this case, a node w on a boundary layer between the portion B1 and the portion B2, which is disposed on the node t side with respect to the layer where the first reference node wb1 is disposed, with respect to a sixth tomographic image which is distant in the rightward direction by five tomographic images from the first reference node wb1, becomes a first target node wt1. Further, a link that connects the first reference node wb1 and the first target node wt1 in a direction that directs from the first reference node wb1 to the first target node wt1 becomes a first additional link AL1. The first additional link AL1 is indicated by a chain line. The first additional link AL1 is set between all nodes w between two layers which become boundaries of the portion B1 for which the upper limit value is set. Since it is not possible to set the first additional link AL1 with respect to five nodes w on the right side of the first layer in the graph 41, the first additional link AL1 is not set therefor.

The labeling unit 23 sets a total value of weights of four n links NL that are intersected by each first additional link AL1 as a weight of each first additional link AL1. Further, the labeling unit 23 determines links to be cut among the s links SL, the t links TL, the n links NL, and the first additional links AL1 by executing a graph cut process with respect to the graph 41 in which the weights are set. Further, if the first additional link AL1 to be cut is determined, the labeling unit 23 determines the n links NL that are intersected by the first additional link AU as links to be cut.

In a case where the scores indicating likenesses of the portions B0 to B3 of the plurality of tomographic images are values shown in table T1 of FIG. 9, in consideration of the weight of the first additional link AL1, links in which the weight in the first direction becomes a minimum become (B0, 1), (B0, 2), (B0, 3), (B0, 4), (B0, 5), (B0, 6), (B1, 7), (B1, 8), (B1, 9), (B1, 10), (B2, 11), (B2, 12), (B2, 13), (B2, 14), (B2, 15), (B3, 16), and (B3, 17). In the second embodiment, the links in which the weight in the first direction in the graph 41 becomes a minimum are indicated by a broken line in FIG. 13. For description, FIG. 13 shows only the first additional link AL1 to be cut. Further, similar to the first embodiment, instead of the link (B3, 3), the link (B0, 3) is cut.

Accordingly, in the graph 41, (B0, 1), (B0, 2), (B0, 3), (B0, 4), (B0, 5), (B0, 6), (B1, 7), (B1, 8), (B1, 9), (B1, 10), (B2, 11), (B2, 12), (B2, 13), (B2, 14), (B2, 15), (B3, 16), and (B3, 17) among the links along the first direction are determined as links to be cut. Further, a link between the sixth and seventh tomographic images, a link between the tenth and eleventh tomographic images, and a link between the fifteenth and sixteenth tomographic images, which are disposed between the links to be cut, among the links along the rightward direction are determined as links to be cut. Thus, links are cut as indicated by a broken line C1 in FIG. 13.

As a result, the portion B0 is allocated to the first to sixth tomographic images, the portion B1 is allocated to the seventh to tenth tomographic images, the portion B2 is allocated to the eleventh to fifteenth tomographic images, and the portion B3 is allocated to the sixteenth to seventeenth tomographic images, respectively.

With respect to the plurality of tomographic images to which the portions B0 to B3 are allocated in this way, scores with respect to the allocated portions become values indicated by bold and oblique numbers shown in FIG. 14. An addition value of the scores becomes a large value compared with a case where any other links are cut.

Next, a third embodiment of the invention will be described. The third embodiment is different from the first embodiment in only the processes performed by the labeling unit 23 and has the same device configuration as that of the first embodiment, and thus, detailed description of the device will not be repeated. The third embodiment is different from the first embodiment in that a lower limit value is set for the number of tomographic images to which the same portion is allocated.

FIG. 15 is a diagram illustrating determination of links to be cut in the third embodiment. In FIG. 15, the same graph as the graph 41 shown in FIG. 8 is shown. In order to set a lower limit value for the number of tomographic images to which the same portion is allocated, the labeling unit 23 sets a second additional link that connects a second reference node which becomes a reference of a layer disposed on a node s side and a second target node which becomes a target on a layer disposed on a node t side with respect to a tomographic image which is less distant by one tomographic image from the lower limit value set in a direction in which the order of tomographic images progresses from the second reference node, in a direction that directs from the second reference node to the second target node, between two layers which become boundaries of a portion for which the lower limit value is set in an n link NL. Specifically, in a case where a lower limit value of 5 is set for the portion B2, a node w corresponding to the first tomographic image on a boundary layer between the portion B1 and the portion B2 of the graph 41 is set as a second reference node wb2. In this case, a node w on a boundary layer between the portion B2 and the portion B3, which is disposed on the node t side with respect to the layer where the second reference node wb2 is disposed, with respect to a fifth tomographic image which is distant in the rightward direction by four tomographic images from the second reference node wb2, becomes a second target node wt2. Further, a link that connects the second reference node wb2 and the second target node wt2 in a direction that directs from the second reference node wb2 to the second target node wt2 becomes a second additional link AL2. The second additional link AL2 is indicated by a chain line. The second additional link AL2 is set between all nodes w between two layers which become boundaries of the portion B2 for which the lower limit value is set. Since it is not possible to set the second additional link AL2 with respect to four nodes w on the right side of the first layer in the graph 41, the second additional link AL2 is not set therefor.

The labeling unit 23 sets a total value of weights of five n links NL in which each second additional link AL2 is included as a weight of each second additional link AL2. Here, "the five n links NL in which each second additional link AL2 is included" includes three n links NL intersected by the second additional link AL2, and two n links NL in which the second reference node wb2 and the second target node wt2 are respectively included. Further, links to be cut among the s links SL, the t links TL, the n links NL, and the second additional links AL2 are determined by executing the graph cut process with respect to the graph 41 in which weights are set. In addition, if the second additional link AL2 to be cut is determined, the labeling unit 23 determines the n links NL in which the second additional link AL2 is included to be cut.

In a case where the scores indicating likenesses of the portions B0 to B3 of the plurality of tomographic images are values shown in table T1 of FIG. 9, in consideration of the weight of the second additional link AL2, links in which the weight in the first direction becomes a minimum become (B0, 1), (B0, 2), (B0, 3), (B0, 4), (B1, 5), (B1, 6), (B1, 7), (B1, 8), (B1, 9), (B1, 10), (B2, 11), (B2, 12), (B2, 13), (B2, 14), (B2, 15), (B3, 16), and (B3, 17). In the third embodiment, the links in which the weight in the first direction in the graph 41 becomes a minimum are indicated by a broken line in FIG. 16. For description, FIG. 16 shows only the second additional link AL2 to be cut. Further, similar to the first embodiment, instead of the link (B3, 3), the link (B0, 3) is cut.

Accordingly, in the graph 41, (B0, 1), (B0, 2), (B0, 3), (B0, 4), (B1, 5), (B1, 6), (B1, 7), (B1, 8), (B1, 9), (B1, 10), (B2, 11), (B2, 12), (B2, 13), (B2, 14), (B2, 15), (B3, 16), and (B3, 17) among links along the first direction are determined as links to be cut. A link between the fourth and fifth tomographic images, a link between the tenth and eleventh tomographic images, and a link between the fifteenth and sixteenth tomographic images, which are disposed between the links to be cut, among links along the rightward direction are determined as links to be cut. Thus, links are cut as indicated by a broken line C2 in FIG. 16.

As a result, the portion B0 is allocated to the first to fourth tomographic images, the portion B1 is allocated to the fifth to tenth tomographic images, the portion B2 is allocated to the eleventh to the fifteenth tomographic images, and the portion B3 is allocated to the sixteenth to seventeenth tomographic images, respectively.

With respect to the plurality of tomographic images to which the portions B0 to B3 are allocated in this way, scores with respect to the allocated portions become values indicated by bold and oblique numbers shown in FIG. 17. An addition value of the scores becomes a large value compared with a case where any other links are cut.

Next, a fourth embodiment of the invention will be described. The fourth embodiment is different from the first embodiment in only the processes performed by the labeling unit 23 and has the same device configuration as that of the first embodiment, and thus, detailed description of the device will not be repeated. The fourth embodiment is different from the first embodiment in that an upper limit value is set for the number of tomographic images to which a plurality of continuous portions are allocated.

FIG. 18 is a diagram illustrating determination of links to be cut in the fourth embodiment. In FIG. 18, the same graph as the graph 41 shown in FIG. 8 is shown. In order to set an upper limit value for the number of tomographic images to which the plurality of continuous portions are allocated, the labeling unit 23 sets a third additional link that connects a third reference node which becomes a reference of a layer disposed most closely to a node s side and a third target node, which becomes a target on a layer disposed most closely to a node t side with respect to a tomographic image which is more distant by one tomographic image from the upper limit value set in a direction in which the order of tomographic images progresses from the third reference node, in a direction that directs from the third reference node to the third target node, between a plurality of layers which become boundaries of a plurality of continuous portions for which the upper limit value is set in an n link NL. Specifically, in a case where an upper limit value of 8 is set for a total length of the portion B1 and the portion B2, a node w corresponding to the first tomographic image on a boundary layer between the portion B0 and the portion B1 of the graph 41, which is disposed most closely to the node s side, among two layers which become boundaries of the portion B1 and the portion B2, is set as a third reference node wb3. In this case, a node w on a boundary layer between the portion B2 and the portion B3, which is disposed most closely to the node t side, with respect to a tenth tomographic image which is distant in the rightward direction by nine tomographic images from the third reference node wb3, becomes a third target node wt3. Further, a link that connects the third reference node wb3 and the third target node wt3 in a direction that directs from the third reference node wb3 to the third target node wt3 becomes a third additional link AL3. The third additional link AL3 is indicated by a chain line. The third additional link AL3 is set between all nodes w between a plurality of layers which become boundaries of a plurality of portions for which the upper limit value is set. Since it is not possible to set the third additional link AL3 with respect to nine nodes w on the right side of the first layer in the graph 41, the third additional link AL3 is not set therefor.

The labeling unit 23 sets a total value of weights of eight n links NL that are intersected by each third additional link AL3 as a weight of each third additional link AL3. Further, the labeling unit 23 determines links to be cut among the s links SL, the t links TL, the n links NL, and the third additional links AL3 by executing the graph cut process with respect to the graph 41 in which the weights are set. Further, if the third additional link AL3 to be cut is determined, the labeling unit 23 determines links to be cut in the n links NL that are intersected by the third additional link AL3 by executing the graph cut process with respect to the n links NL that are intersected by the third additional link AL3.

In a case where the scores indicating likenesses of the portions B0 to B3 of the plurality of tomographic images are values shown in table T1 of FIG. 9, in consideration of the weight of the third additional link AL3, links in which the weight in the first direction becomes a minimum become (B0, 1), (B0, 2), (B0, 3), (B0, 4), (B0, 5), (B0, 6), (B1, 7), (B1, 8), (B1, 9), (B1, 10), (B1, 11), (B1, 12), (B1, 13), (B2, 14), (B3, 15), (B3, 16), and (B3, 17). In the fourth embodiment, the links in which the weight in the first direction in the graph 41 becomes a minimum are indicated by a broken line in FIG. 19. For description, FIG. 19 shows only the third additional link AL3 to be cut. Further, similar to the first embodiment, instead of the link (B3, 3), the link (B0, 3) is cut.

Accordingly, in the graph 41, (B0, 1), (B0, 2), (B0, 3), (B0, 4), (B0, 5), (B0, 6), (B1, 7), (B1, 8), (B1, 9), (B1, 10), (B1, 11), (B1, 12), (B1, 13), (B2, 14), (B3, 15), (B3, 16), and (B3, 17) among the links along the first direction are determined as links to be cut. Further, a link between the sixth and seventh tomographic images, a link between the thirteenth and fourteenth tomographic images, and a link between the fourteenth and fifteenth tomographic images, which are disposed between the links to be cut, among the links along the rightward direction are determined as links to be cut. Thus, links are cut as indicated by a broken line C3 in FIG. 19.

As a result, the portion B0 is allocated to the first to sixth tomographic images, the portion B1 is allocated to the seventh to thirteenth tomographic images, the portion B2 is allocated to the fourteenth tomographic image, and the portion B3 is allocated to the fifteenth to seventeenth tomographic images, respectively.

With respect to the plurality of tomographic images to which the portions B0 to B3 are allocated in this way, scores with respect to the allocated portions become values indicated by bold and oblique numbers shown in FIG. 20. An addition value of the scores becomes a large value compared with a case where any other links are cut.

Next, a fifth embodiment of the invention will be described. The fifth embodiment is different from the first embodiment in only the processes performed by the labeling unit 23 and has the same device configuration as that of the first embodiment, and thus, detailed description of the device will not be repeated. The fifth embodiment is different from the first embodiment in that a lower limit value is set for the number of tomographic images to which a plurality of continuous portions are allocated.

FIG. 21 is a diagram illustrating determination of links to be cut in the fifth embodiment. In FIG. 21, the same graph as the graph 41 shown in FIG. 8 is shown. In order to set a lower limit value for the number of tomographic images to which the plurality of continuous portions are allocated, the labeling unit 23 sets a fourth additional link that connects a fourth reference node which becomes a reference of a layer disposed most closely to a node s side and a fourth target node which becomes a target on a layer disposed most closely to node t side with respect to a tomographic image which is less distant by one tomographic image from the lower limit value set in a direction in which the order of tomographic images progresses from the fourth reference node, in a direction that directs from the fourth target node to the fourth reference node, between a plurality of layers which become boundaries of a plurality of continuous portions for which the lower limit value is set in an n link NL. Specifically, in a case where a lower limit value of 11 is set for a total length of the portion B1 and the portion B2, a node w corresponding to the first tomographic image on a boundary layer between the portion B0 and the portion B1 of the graph 41, which is disposed most closely to the node side s, among two boundary layers of the portion B1 and the portion B2 is set as a fourth reference node wb4. In this case, a node w on a boundary layer between the portion B2 and the portion B3, which is disposed most closely to the node t side, with respect to an eleventh tomographic image which is distant in the rightward direction by ten tomographic images from the fourth reference node wb4, becomes a fourth target node wt4. Further, a link that connects the fourth reference node wb4 and the fourth target node wt4 in a direction that directs from the fourth target node wt4 to the fourth reference node wb4 becomes a fourth additional link AL4. The fourth additional link AL4 is indicated by a chain line. The fourth additional link AL4 is set between all nodes w between a plurality of layers which become boundaries of a plurality of portions for which the lower limit value is set. Since it is not possible to set the fourth additional link AL4 with respect to ten nodes w on the right side of the first layer in the graph 41, the fourth additional link AL4 is not set therefor.

The labeling unit 23 sets a total value of weights of ten n links NL in which each fourth additional link AL4 is included as a weight of each fourth additional link AL4. Here, "the ten n links NL in which each fourth additional link AL4 is included" includes nine n links NL intersected by the fourth additional link AL4, and eleven n links NL in which the fourth reference node wb4 and the fourth target node wt4 are respectively included. Further, links to be cut among the s links SL, the t links TL, the n links NL, and the fourth additional links AL4 are determined by executing the graph cut process with respect to the graph 41 in which weights are set. In addition, if the fourth additional link AL4 to be cut is determined, the labeling unit 23 determines links to be cut in the n links NL in which the fourth additional link AL4 is included, by executing the graph cut process with respect to the n links NL in which the fourth additional link AL4 is included.

Figures 22, 23:
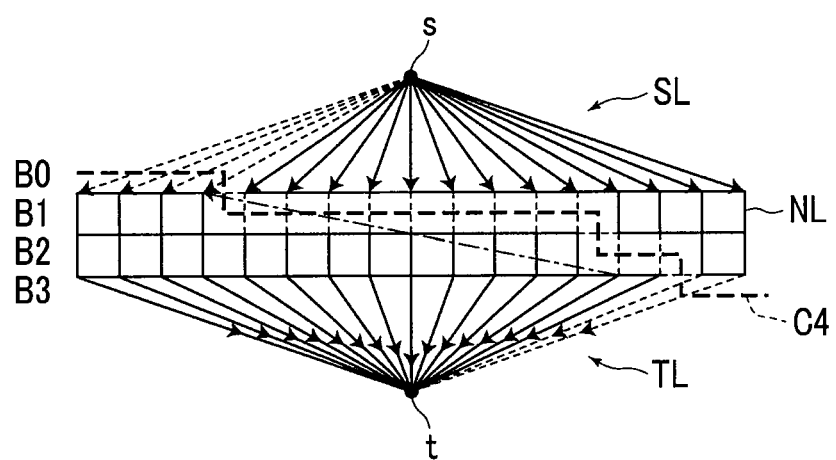
FIG. 22 is a diagram showing links in which a weight becomes a minimum in the fifth embodiment.
FIG. 23 is a diagram showing a table in which scores with respect to allocated portions are indicated by bold and oblique numbers, in the fifth embodiment.

In a case where the scores indicating likenesses of the portions B0 to B3 of the plurality of tomographic images are values shown in table T1 of FIG. 9, in consideration of the weight of the fourth additional link AL4, links in which the weight in the first direction becomes a minimum become (B0, 1), (B0, 2), (B0, 3), (B0, 4), (B1, 5), (B1, 6), (B1, 7), (B1, 8), (B1, 9), (B1, 10), (B1, 11), (B1, 12), (B1, 13), (B2, 14), (B2, 15), (B3, 16), and (B3, 17). In the fifth embodiment, the links in which the weight in the first direction in the graph 41 becomes a minimum are indicated by a broken line in FIG. 22. For description, FIG. 22 shows only the fourth additional link AL4 to be cut. Further, similar to the first embodiment, instead of the link (B3, 3), the link (B0, 3) is cut.

Accordingly, in the graph 41, (B0, 1), (B0, 2), (B0, 3), (B0, 4), (B1, 5), (B1, 6), (B1, 7), (B1, 8), (B1, 9), (B1, 10), (B1, 11), (B1, 12), (B1, 13), (B2, 14), (B2, 15), (B3, 16), and (B3, 17) among links along the first direction are determined as links to be cut. A link between the fourth and fifth tomographic images, a link between the thirteenth and fourteenth tomographic images, and a link between the fifteenth and sixteenth tomographic images, which are disposed between the links to be cut, among links along the rightward direction are determined as links to be cut. Thus, links are cut as indicated by a broken line C4 in FIG. 22.

As a result, the portion B0 is allocated to the first to fourth tomographic images, the portion B1 is allocated to the fifth to thirteenth tomographic images, the portion B2 is allocated to the fourteenth to the fifteenth tomographic images, and the portion B3 is allocated to the sixteenth to seventeenth tomographic images, respectively.

With respect to the plurality of tomographic images to which the portions B0 to B3 are allocated in this way, scores with respect to the allocated portions become values indicated by bold and oblique numbers shown in FIG. 23. An addition value of the scores becomes a large value compared with a case where any other links are cut.

In the above-described embodiment, the sorting result may be displayed on the display 14. An operator may modify the sorting result with reference to the sorting result displayed on the display 14. In this case, with respect to a tomographic image in which an allocated portion is modified, an infinite regulation value in the first direction is added with respect to the n links NL corresponding to the tomographic image. Further, the sorting process corresponding to the tomographic image is executed again. Thus, since the n links NL in which the regulation value is added is not cut, it is possible to perform the sorting process in consideration of the modification result.

In the second embodiment, an upper limit value is set for the number of tomographic images allocated to the same portion, but additionally, a lower limit value may be set thereto, similar to the third embodiment. Further, in the second embodiment, additionally similar to the fourth embodiment, an upper limit value may be set for the number of tomographic images allocated to a plurality of continuous portions, and similar to the fifth embodiment, a lower limit value may be set for the number of tomographic images allocated to a plurality of continuous portions. In addition, in the third embodiment, the lower limit value may be set for the number of tomographic images allocated to the same portion, but additionally, similar to the fourth embodiment, an upper limit value may be set for the number of tomographic images allocated to a plurality of continuous portions, and similar to the fifth embodiment, a lower limit value may be set for the number of tomographic images allocated to a plurality of continuous portions. Furthermore, in the fourth embodiment, the upper limit value may be set for the number of tomographic images allocated to the plurality of continuous portions, but additionally, similar to the fifth embodiment, the lower limit value may be set for the number of tomographic images allocated to the plurality of continuous portions.

In the above-described embodiments, a plurality of tomographic images are sorted into labels of a plurality of portions, but sorting targets are not limited thereto. For example, the invention may be applied to a case where sets of gene elements are sorted.

Hereinafter, effects of the embodiments will be described.

As a plurality of pieces of data become a plurality of tomographic images in a plurality of cross sections perpendicular to an axis that extends in a predetermined direction, with respect to a subject in which N (N>2) portions are arranged in the predetermined direction in a specific order from 0 to N−1 and elements become the portions, it is possible to sort the plurality of tomographic images into a plurality of classes with high accuracy in the order in which the portions are arranged while maintaining the length for each portion.

Hereinafter, embodiments of the invention will be described.

Embodiment 1

A data sorting apparatus that sorts, with respect to subjects in which N (N>2) portions are arranged in a predetermined direction in a specific order from 0 to N−1, each of a plurality of tomographic images in a plurality of cross sections perpendicular to an axis that extends in the predetermined direction, arranged in an order corresponding to the specific order and having scores indicating portion likenesses for the plurality of respective portions, into any one of N labels in the specific order, including:

labeling means for determining, when k (=N−1) stages of layers which are boundaries between the respective labels are provided in the specific order between a node s and a node t which are references of a 0-th element and an (N−1)-th element among the N portions and a plurality of nodes w respectively corresponding to the respective tomographic images arranged in the corresponding order are provided on each layer i (i=1 to k), using a graph having s links corresponding to the 0-th portion which connect the node s and the entire nodes w in a first layer in a first direction that directs from the node s to the node t, t links corresponding to the (N−1)-th portion which connect the entire nodes w in a k-th layer and the node t in the first direction, and n links that connect all the nodes w in both directions, in which spaces between the respective layers from the first layer to the k-th layer correspond to the first portion to an (N−2)-th portion, links to be cut among the s links, the t links and the n links using a graph cut process, and for respectively allocating the N labels to the respective tomographic images in the specific order, wherein the labeling means sets, for each tomographic image, weights with respect to the s link, the t link, and the n links along the first direction so that a small weight is given to a link corresponding to a portion having a maximum score in the tomographic image, wherein the labeling means sets a weight for regulating cutting with respect to n links along a second direction opposite to the first direction and n links along a direction in which the order of the respective tomographic images progresses, among the plurality of n links, and wherein the labeling means determines the links to be cut among the s links, the t links and the n links by executing the graph cut process with respect to the graph for which the weights are set, and allocates the N labels corresponding to the respective portions to the plurality of tomographic images.

Embodiment 2

The data sorting apparatus according to Embodiment 1, wherein the labeling means sets, in a case where an upper limit value is set for the number of tomographic images to which the same label is allocated, a first additional link that connects a first reference node which becomes a reference of a layer disposed on the node s side and a first target node which becomes a target on a layer disposed on the node t side with respect to data which is more distant by one tomographic image from the upper limit value in a direction where the order of the respective pieces of data progresses from the first reference node, in a direction that directs from the first reference node to the first target node, between two layers which become boundaries of an n link corresponding to a portion of a label for which the upper limit value is set, and allows cutting with respect to only links of a number which is equal to or smaller than the number of links intersected by the first additional link, with respect to the n links that connect the nodes w corresponding to tomographic images to which the label for which the upper limit value is set is allocated.

Embodiment 3

The data sorting apparatus according to Embodiment 1 or 2, wherein the labeling means sets, in a case where a lower limit value is set for the number of tomographic images to which the same label is allocated, a second additional link that connects a second reference node which becomes a second reference of a layer disposed on the node s side and a second target node which becomes a target on a layer disposed on the node t side with respect to data which is less distant by one tomographic image from the lower limit value in the direction where the order of the respective pieces of data progresses from the second reference node, in a direction that directs from the second target node to the second reference node, between two layers which become boundaries of an n link corresponding to a portion of a label for which the lower limit value is set, and allows cutting with respect to only links of a number which exceeds the number of links in which the second additional link is included, with respect to the n links that connect the nodes w corresponding to data to which the label for which the lower limit value is set is allocated.

Embodiment 4

The data sorting apparatus according to any one of Embodiments 1 or 3, wherein the labeling means sets, in a case where an upper limit value is set for the number of tomographic images to which a plurality of continuous labels are allocated, a third additional link that connects a third reference node which becomes a reference of a layer disposed most closely to the node s side and a third target node which becomes a target on a layer disposed most closely to the node t side with respect to data which is more distant by one tomographic image from the upper limit value in the direction where the order of the respective pieces of data progresses from the third reference node, in a direction that directs from the third reference node to the third target node, between two layers which become boundaries of the n links NL corresponding to portions of a plurality of labels for which the upper limit value is set, and allows cutting with respect to only links of a number which is equal to or smaller than the number of links that are intersected by the third additional link, with respect to the n links that connect the nodes w corresponding to data to which a plurality of labels for which the upper limit value is set are allocated.

Embodiment 5

The data sorting apparatus according to any one of Embodiments 1 to 4, wherein the labeling means sets, in a case where a lower limit value is set for the number of tomographic images to which the plurality of continuous labels are allocated, a fourth additional link that connects a fourth reference node which becomes a reference of a layer disposed most closely to the node s side and a fourth target node which becomes a target on a layer disposed most closely to the node t side with respect to data which is less distant by one tomographic image from the lower limit value in the direction where the order of the respective pieces of data progresses from the fourth reference node, in a direction that directs from the fourth target node to the fourth reference node, between two layers which become boundaries of the n links corresponding to portions of a plurality of labels for which the lower limit value is set, and allows cutting with respect to only links of a number which is equal to or smaller than the number of links in which the fourth additional link is included, with respect to the n links that connect the nodes w corresponding to data to which a plurality of labels for which the lower limit value is set are allocated.

EXPLANATION OF REFERENCES

1: data sorting apparatus
2: three-dimensional image capture apparatus
3: image storage server
4: network
11: CPU
12: memory
13: storage
14: display
15: input unit
21: image acquisition unit
22: score calculation unit
23: labeling unit
31: head portion
32: chest portion
33: abdominal portion
34: leg portion
40, 41: graph
SL: s link
TL: t link
NL: n link

What is claimed is:

1. A data sorting apparatus that sorts, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, comprising:

a processor configured to determine, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the processor is further configured to set, for each piece of data, weights with respect to the s link, the t link, and the n links along the first direction so that a small weight is given to a link corresponding to an element having a maximum score in the data, wherein the is further configured to set a weight for regulating cutting with respect to n links along a second direction opposite to the first direction and n links along a direction in which the order of the respective pieces of data progresses, among the plurality of n links, wherein the processor is further configured to determine the links to be cut among the s links, the t links and the n links by executing the graph cut process with respect to the graph for which the weights are set, and allocates the N labels corresponding to the respective elements to the plurality of pieces of data, thereby sorting the plurality of tomographic images into a plurality of classes based on the allocated N labels, and wherein the processor is further configured to display the plurality of pieces of data based on the allocated N labels.

2. The data sorting apparatus according to claim 1, wherein the labeling unit sets, in a case where an upper limit value is set for the number of pieces of data to which the same label is allocated, a first additional link that connects a first reference node which becomes a reference of a layer disposed on the node s side and a first target node which becomes a target on a layer disposed on the node t side with respect to data which is more distant by one piece of data from the upper limit value in the direction where the order of the respective pieces of data progresses from the first reference node, in a direction that directs from the first reference node to the first target node, between two layers which become boundaries of an n link corresponding to an element of a label for which the upper limit value is set, and allows cutting with respect to only links of a number which is equal to or smaller than the number of links intersected by the first additional link, with respect to the n links that connect the nodes w corresponding to data to which the label for which the upper limit value is set is allocated.

3. The data sorting apparatus according to claim 1, wherein the labeling unit sets, in a case where a lower limit value is set for the number of pieces of data to which the same label is allocated, a second additional link that connects a second reference node which becomes a second reference of a layer disposed on the node s side and a second target node which becomes a target on a layer disposed on the node t side with respect to data which is less distant by one piece of data from the lower limit value in the direction where the order of the respective pieces of data progresses from the second reference node, in a direction that directs from the second target node to the second reference node, between two layers which become boundaries of an n link corresponding to an element of a label for which the lower limit value is set, and allows cutting with respect to only links of a number which exceeds the number of links in which the second additional link is included, with respect to the n links that connect the nodes w corresponding to data to which the label for which the lower limit value is set is allocated.

4. The data sorting apparatus according to claim 1, wherein the labeling unit sets, in a case where an upper limit value is set for the number of pieces of data to which a plurality of continuous labels are allocated, a third additional link that connects a third reference node which becomes a reference of a layer disposed most closely to the node s side and a third target node which becomes a target on a layer disposed most closely to the node t side with respect to data which is more distant by one piece of data from the upper limit value in the direction where the order of the respective pieces of data progresses from the third reference node, in a direction that directs from the third reference node to the third target node, between two layers which become boundaries of the n links corresponding to elements of a plurality of labels for which the upper limit value is set, and allows cutting with respect to only links of a number which is equal to or smaller than the number of links that are intersected by the third additional link, with respect to the n links that connect the nodes w corresponding to data to which a plurality of labels for which the upper limit value is set are allocated.

5. The data sorting apparatus according to claim 1, wherein the labeling unit sets, in a case where a lower limit value is set for the number of pieces of data to which the plurality of continuous labels are allocated, a fourth additional link that connects a fourth reference node which becomes a reference of a layer disposed most closely to the node s side and a fourth target node which becomes a target on a layer disposed most closely to the node t side with respect to data which is less distant by one piece of data from the lower limit value in the direction where the order of the respective pieces of data progresses from the fourth reference node, in a direction that directs from the fourth target node to the fourth reference node, between two layers which become boundaries of the n links corresponding to elements of a plurality of labels for which the lower limit value is set, and allows cutting with respect to only links of a number which is equal to or smaller than the number of links in which the fourth additional link is included, with respect to the n links that connect the nodes w corresponding to data to which a plurality of labels for which the lower limit value is set are allocated.

6. The data sorting apparatus according to claim 1, wherein the plurality of pieces of data are the plurality of tomographic images in a plurality of cross sections perpendicular to an axis that extends in a predetermined direction, with respect to a subject in which N (N>2) portions are arranged in the predetermined direction in a specific order from 0 to N−1, and the elements are the portions.

7. A data sorting method for sorting, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, the method comprising:
a step of determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the step includes
a step of setting, for each piece of data, weights with respect to the s link, the t link, and the n links along the first direction so that a small weight is given to a link corresponding to an element having a maximum score in the data,
a step of setting a weight for regulating cutting with respect to n links along a second direction opposite to the first direction and n links along a direction in which the order of the respective pieces of data progresses, among the plurality of n links,
a step of determining the links to be cut among the s links, the t links and the n links by executing the graph cut process with respect to the graph for which the weights are set, and allocating the N labels corresponding to the respective elements to the plurality of pieces of data, thereby sorting the plurality of tomographic images into a plurality of classes based on the allocated N labels; and
a step of displaying the plurality of pieces of data based on the allocated N labels.

8. A non-transitory recording medium storing therein a data sorting program that causes a computer to execute a data sorting method for sorting, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, the program causing the computer to execute:
a process of determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the process includes
a process of setting, for each piece of data, weights with respect to the s link, the t link, and the n links along the first direction so that a small weight is given to a link corresponding to an element having a maximum score in the data, a process of setting a weight for regulating cutting with respect to n links along a second direction opposite to the first direction and n links along a direction in which the order of the respective pieces of data progresses, among the plurality of n links, and a process of determining the links to be cut among the s links, the t links and the n links by executing the graph cut process with respect to the graph for which the weights are set, and allocating the N labels corresponding to the respective elements to the plurality of pieces of data, thereby sorting the plurality of tomographic images into a plurality of classes based on the allocated N labels, wherein the processor is further configured to display the plurality of pieces of data based on the allocated N labels.

9. A data sorting apparatus that sorts, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, comprising:

a processor configured to determine, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the processor is further configured to set, for each piece of data, weights with respect to the s link, the t link, and the n links along the first direction so that a small weight is given to a link corresponding to an element having a maximum score in the data, wherein the is further configured to set a weight for regulating cutting with respect to n links along a second direction opposite to the first direction and n links along a direction in which the order of the respective pieces of data progresses, among the plurality of n links, wherein the processor is further configured to determine the links to be cut among the s links, the t links and the n links by executing the graph cut process with respect to the graph for which the weights are set, and allocates the N labels corresponding to the respective elements to the plurality of pieces of data, wherein the processor is further configured to display the plurality of pieces of data based on the allocated N labels, and wherein the processor is further configured to receive a user input representative of an intent of a diagnostician of a modification of at least one allocated N label and sort the plurality of pieces of data again, the plurality of pieces of data being the plurality of tomographic images, based on the modified at least one allocated N label.

10. The data sorting apparatus according to claim 9, wherein the labeling unit sets, in a case where an upper limit value is set for the number of pieces of data to which the same label is allocated, a first additional link that connects a first reference node which becomes a reference of a layer disposed on the node s side and a first target node which becomes a target on a layer disposed on the node t side with respect to data which is more distant by one piece of data from the upper limit value in the direction where the order of the respective pieces of data progresses from the first reference node, in a direction that directs from the first reference node to the first target node, between two layers which become boundaries of an n link corresponding to an element of a label for which the upper limit value is set, and allows cutting with respect to only links of a number which is equal to or smaller than the number of links intersected by the first additional link, with respect to the n links that connect the nodes w corresponding to data to which the label for which the upper limit value is set is allocated.

11. The data sorting apparatus according to claim 9, wherein the labeling unit sets, in a case where a lower limit value is set for the number of pieces of data to which the same label is allocated, a second additional link that connects a second reference node which becomes a second reference of a layer disposed on the node s side and a second target node which becomes a target on a layer disposed on the node t side with respect to data which is less distant by one piece of data from the lower limit value in the direction where the order of the respective pieces of data progresses from the second reference node, in a direction that directs from the second target node to the second reference node, between two layers which become boundaries of an n link corresponding to an element of a label for which the lower limit value is set, and allows cutting with respect to only links of a number which exceeds the number of links in which the second additional link is included, with respect to the n links that connect the nodes w corresponding to data to which the label for which the lower limit value is set is allocated.

12. The data sorting apparatus according to claim 9, wherein the labeling unit sets, in a case where an upper limit value is set for the number of pieces of data to which a plurality of continuous labels are allocated, a third additional link that connects a third reference node which becomes a reference of a layer disposed most closely to the node s side and a third target node which becomes a target on a layer disposed most closely to the node t side with respect to data which is more distant by one piece of data from the upper limit value in the direction where the order of the respective pieces of data progresses from the third reference node, in a direction that directs from the third reference node to the third target node, between two layers which become boundaries of the n links corresponding to elements of a plurality of labels for which the upper limit value is set, and allows cutting with respect to only links of a number which is equal to or smaller than the number of links that are intersected by the third additional link, with respect to the n links that connect the nodes w corresponding to data to which a plurality of labels for which the upper limit value is set are allocated.

13. The data sorting apparatus according to claim 9, wherein the labeling unit sets, in a case where a lower limit value is set for the number of pieces of data to which the plurality of continuous labels are allocated, a fourth additional link that connects a fourth reference node which becomes a reference of a layer disposed most closely to the node s side and a fourth target node which becomes a target on a layer disposed most closely to the node t side with respect to data which is less distant by one piece of data from the lower limit value in the direction where the order of the respective pieces of data progresses from the fourth reference node, in a direction that directs from the fourth target node to the fourth reference node, between two layers which become boundaries of the n links corresponding to elements of a plurality of labels for which the lower limit value is set, and allows cutting with respect to only links of a number which is equal to or smaller than the number of links in which the fourth additional link is included, with respect to the n links that connect the nodes w corresponding to data to which a plurality of labels for which the lower limit value is set are allocated.

14. The data sorting apparatus according to claim 9, wherein the plurality of pieces of data are the plurality of tomographic images in a plurality of cross sections perpendicular to an axis that extends in a predetermined direction, with respect to a subject in which N (N>2) portions are arranged in the predetermined direction in a specific order from 0 to N−1, and the elements are the portions.

15. A data sorting method for sorting, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, the method comprising:

a step of determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the step includes a step of setting, for each piece of data, weights with respect to the s link, the t link, and the n links along the first direction so that a small weight is given to a link corresponding to an element having a maximum score in the data, a step of setting a weight for regulating cutting with respect to n links along a second direction opposite to the first direction and n links along a direction in which the order of the respective pieces of data progresses, among the plurality of n links, and a step of determining the links to be cut among the s links, the t links and the n links by executing the graph cut process with respect to the graph for which the weights are set, and allocating the N labels corresponding to the respective elements to the plurality of pieces of data;

a step of displaying the plurality of pieces of data based on the allocated N labels;

a step of receiving a user input representative of an intent of a diagnostician of a modification of at least one allocated N label; and a step of sorting the plurality of pieces of data again, the plurality of pieces of data being the plurality of tomographic images, based on the modified at least one allocated N label.

16. A non-transitory recording medium storing therein a data sorting program that causes a computer to execute a data sorting method for sorting, with respect to a plurality of pieces of data in which N (N>2) elements are arranged in a predetermined direction in a specific order from 0 to N−1, each of the plurality of pieces of data which are arranged in an order corresponding to the specific order, having scores indicating element likenesses for the plurality of respective elements, into any one of N labels in the specific order, the plurality of pieces of data being a plurality of tomographic images, the program causing the computer to execute:

a process of determining, when k (=N−1) stages of layers which are boundaries between the respective labels are provided in the specific order between a node s and a node t which are references of a 0-th element and an (N−1)-th element among the N elements and a plurality of nodes w respectively corresponding to the plurality of pieces of data arranged in the corresponding order are provided on each layer i (i=1 to k), using a graph having s links corresponding to the 0-th element which connect the node s and the entire nodes w in a first layer in a first direction that directs from the node s to the node t, t links corresponding to the (N−1)-th element which connect the entire nodes w in a k-th layer and the node t in the first direction, and n links that connect all the nodes w in both directions, in which spaces between the respective layers from the first layer to the k-th layer correspond to the first element to an (N−2)-th element, links to be cut among the s links, the t links and the n links using a graph cut process, and for respectively allocating the N labels to the data in the specific order, wherein the process includes a process of setting, for each piece of data, weights with respect to the s link, the t link, and the n links along the first direction so that a small weight is given to a link corresponding to an element having a maximum score in the data, a process of setting a weight for regulating cutting with respect to n links along a second direction opposite to the first direction and n links along a direction in which the order of the respective pieces of data progresses, among the plurality of n links, and a process of determining the links to be cut among the s links, the t links and the n links by executing the graph cut process with respect to the graph for which the weights are set, and allocating the N labels corresponding to the respective elements to the plurality of pieces of data, wherein the processor is further configured to display the plurality of pieces of data based on the allocated N labels, a process of receiving a user input representative of an intent of a diagnostician of a modification of at least one allocated N label; and a process of sorting the plurality of pieces of data again, the plurality of pieces of data being the plurality of tomographic images, based on the modified at least one allocated N label.

\* \* \* \* \*